Jan. 11, 1949.    O. R. CARPENTER ET AL    2,458,503
ELECTRICAL CONTROL SYSTEM
Filed Nov. 9, 1946    3 Sheets-Sheet 1

Otis R. Carpenter &
FRANK W. ARMSTRONG, Jr.
INVENTORS

BY
ATTORNEY

Otis R. Carpenter &
FRANK W. ARMSTRONG, Jr.
INVENTORS

ATTORNEY

Otis R. Carpenter &
FRANK W. ARMSTRONG, Jr.
INVENTORS

Patented Jan. 11, 1949

2,458,503

UNITED STATES PATENT OFFICE 2,458,503

ELECTRICAL CONTROL SYSTEM

Otis R. Carpenter and Frank W. Armstrong, Jr., Barberton, Ohio, assignors to The Babcock & Wilcox Company, Rockleigh, N. J., a corporation of New Jersey Application November 9, 1946, Serial No. 708,858

6 Claims. (Cl. 314—64)

This invention relates to an automatic electric arc welding system and more particularly to an electronic means for the control of the electrode, or electrodes, of such a system. It provides an improved means for the control of one or more motors which are geared together through a differential assembly so as to complete means for advancing or retracting the electrode with reference to the work in order that constant and accurate control of the arc voltage or arc length is obtained.

Representative control systems and mechanical means for driving the welding electrode have heretofore consisted of means for operation of a single shunt wound direct current motor powered by means of two inversely connected grid controlled valve tubes such as thyratrons, or by a mechanical contacting means for varying the shunt field or motor armature currents. Where one motor or driver is employed, the control of the arc voltage necessitates the overcoming of the inertia of the moving parts of the driver resulting in over-runs and consequently erratic arc-voltage control. Where two motors or drivers which drive through a differential gear assembly have been employed, a typical arrangement includes a constant speed alternating current motor, with the other motor a shunt wound direct current motor. Because of the constant speed motor, the operation of this system results in a jerky movement of the electrode, and in what is known as pumping of the arc, because of the difficulty of controlling the relative speed of the shunt wound motor.

It is one object of this invention to provide a control means for the electrode operating motors of a differential electrode drive system which will so introduce arc voltage into electronic control circuits so as to effect a smooth, sensitively responsive control of the speed of two variable speed motors, and thereby effect stabilized arc conditions.

It is another object of this invention to interlock the control means of the one drive motor with that of the other drive motor so as to eliminate all jerky operation of the system and so provide a constant arc length under all conditions of welding.

A further object of this invention is the elimination of the "rod feed" control methods common to prior arc welding systems by providing an interlocked and compensating system between the up-driver and the down-driver systems.

Other objects of this invention and advantages of the system will appear from the description given below. While this description is taken in connection with gas arc welding, it is also applicable to metallic arc welding, heliarc and other automatic welding systems.

Figure 1:
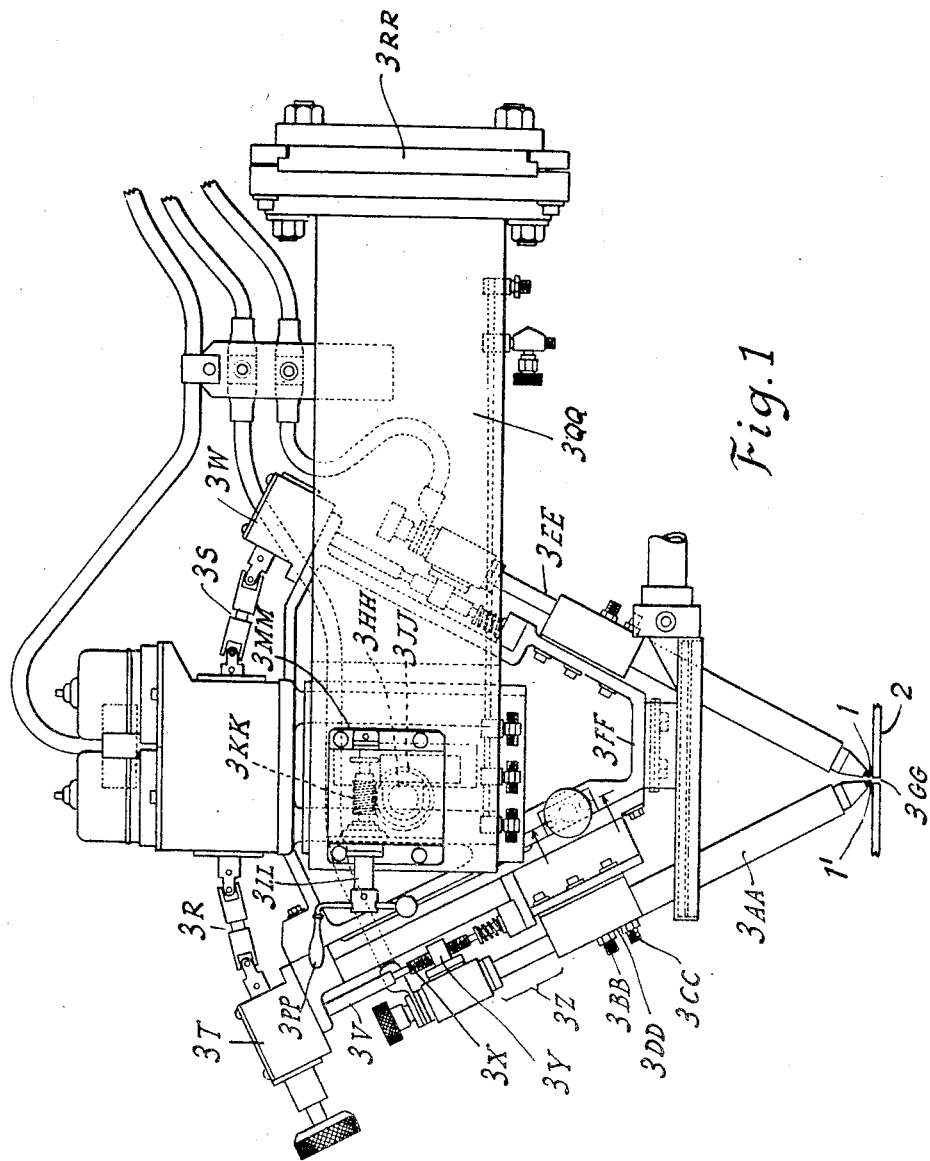
Fig. 1 is an elevation of the welding head and its supporting structure.
Figure 2:
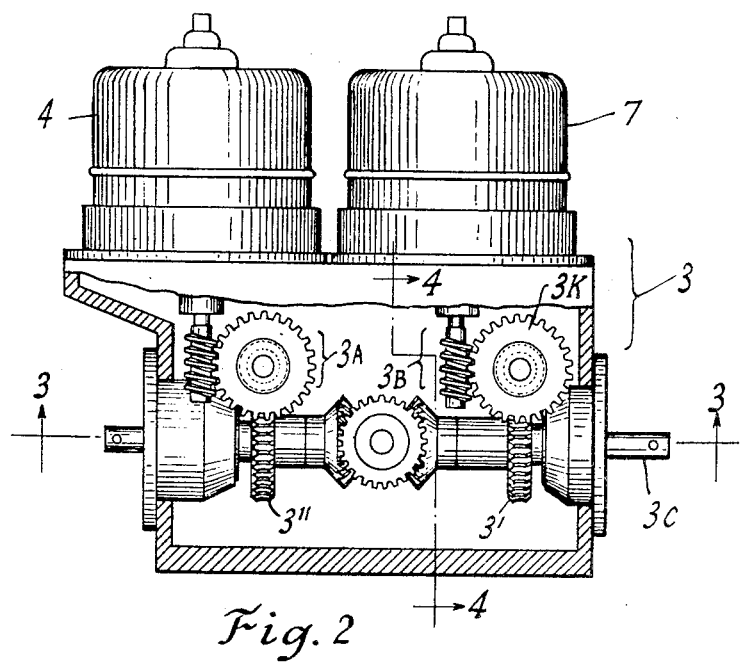
Fig. 2 shows the driving motors in elevation with the supporting gear casing broken away to show the differential driving mechanism.

By way of example of an application of the invention principles, Fig. 1 of the drawings shows a welding head for atomic hydrogen arc welding. This welding head feeds the small diameter tungsten electrodes 1 and 1' toward or from the work 2 by feed mechanism driven through a differential gearing assembly 3 (Fig. 2). The driving elements 3' and 3'' of the gearing are operatively connected by the gearing trains 3A and 3B respectively, the high speed series wound direct current motor 4 being connected by the double reduction gear train 3A to the differential driving element 3'' and the similar or oppositely rotating motor 7 being connected to the differential driving element 3' by the gear train 3B.

Figure 3:
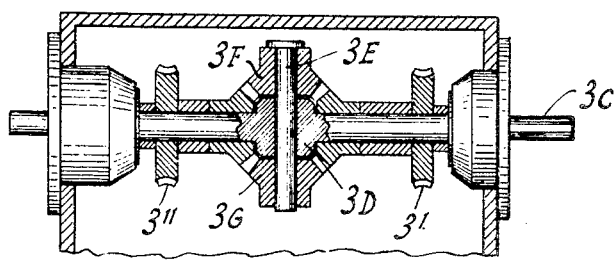
Fig. 3 is a sectional plan of the differential mechanism on the line 3—3 of Fig. 2, and looking in the direction of the arrows.

As indicated in Figs. 2 and 3 of the drawings, the differential elements are assembled upon the shaft 3C which constitutes the driven element of the differential. Centrally of this shaft, there is a large hub 3D through which the trunnion 3E extends for mounting the planetary differential pinions 3F and 3G.

Figure 4:
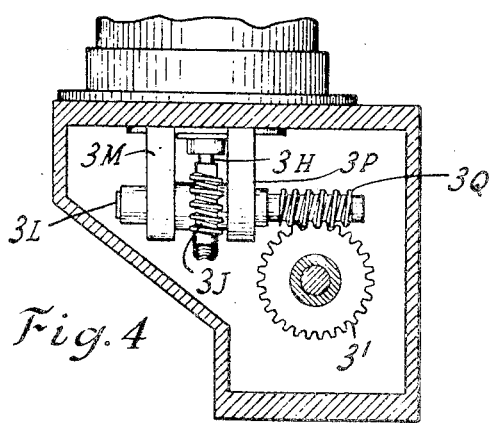
Fig. 4 is a vertical section through the casing for the differential mechanism, on the line 4—4 of Fig. 2 and looking in the direction of the arrows.

Fig. 3, in conjunction with Fig. 4 shows the arrangement of elements in the gear train 3B with the worm 3J on the motor shaft 3H driving the worm gear 3K. The counter-shaft 3L for this worm gear is horizontally journalled in supports 3M and 3P and at its end there is fixed a worm 3Q which meshes with and drives the driving element 3' of the differential. The elements of the other gear train connecting the motor 4 to the differential are similar to those just described.

The driven shaft 3C of the differential has universal joint connections 3R and 3S at its opposite ends as indicated in Fig. 1 for operating bevel gearing within each of the gear boxes 3T and 3W. The bevel gears, for example, in the gear box 3T rotate the upright screw-threaded shaft 3V, the screw-threaded portion 3X of this shaft co-acting with the internal threads upon a nut 3Y which is fixed to an electrode holder 3Z. This electrode holder is movable within the tubular guide 3AA through which hydrogen and cooling fluid are supplied, these fluids being conducted through such inlets as those shown at 3BB and 3CC for the inlet header 3DD.

With the above indicated mechanism, the weldrod holder and its electrode 1' are advanced or retracted with reference to the work 2 according to the direction in which the differential driving shaft 3C is rotated.

As clearly shown in Fig. 1, the electrode holder 3Z and its associated mechanism are disposed at a vertically inclined position and the similar electrode holder 3EE and similarly associated mechanism are secured to the opposite side of electrode support 3FF. Thus the electrode supports are downwardly converging so that the arcing tips of the electrodes are disposed in their operative positions to dispose the arc between them transversely of the weld seam 3GG, or the line of the weld.

The electrode holder support structure including the base 3FF also has the motor and differential assembly mounted thereon, together with the interposed operating mechanism, and the entire unit is adjustable transversely of the weld seam 3GG by reason of its pivotal mounting about a fixed rod 3HH. This rod has a worm gear 3JJ fixed thereon, and meshing with this gear is a worm 3KK fixed to an adjusting shaft 3LL. This shaft is rotatably mounted within the housing 3MM which is fixed to the electrode and driving mechanism support 3FF and the left hand end of this shaft 3FF carries the adjusting crank 3PP.

The supporting rod 3HH is fixed to one or more structural members 3QQ extending horizontally from the fixed support 3RR and there may be a plurality of the electrode and driving units spaced along the rod 3HH and thus disposed in succession along the line of the weld.

Figure 5:
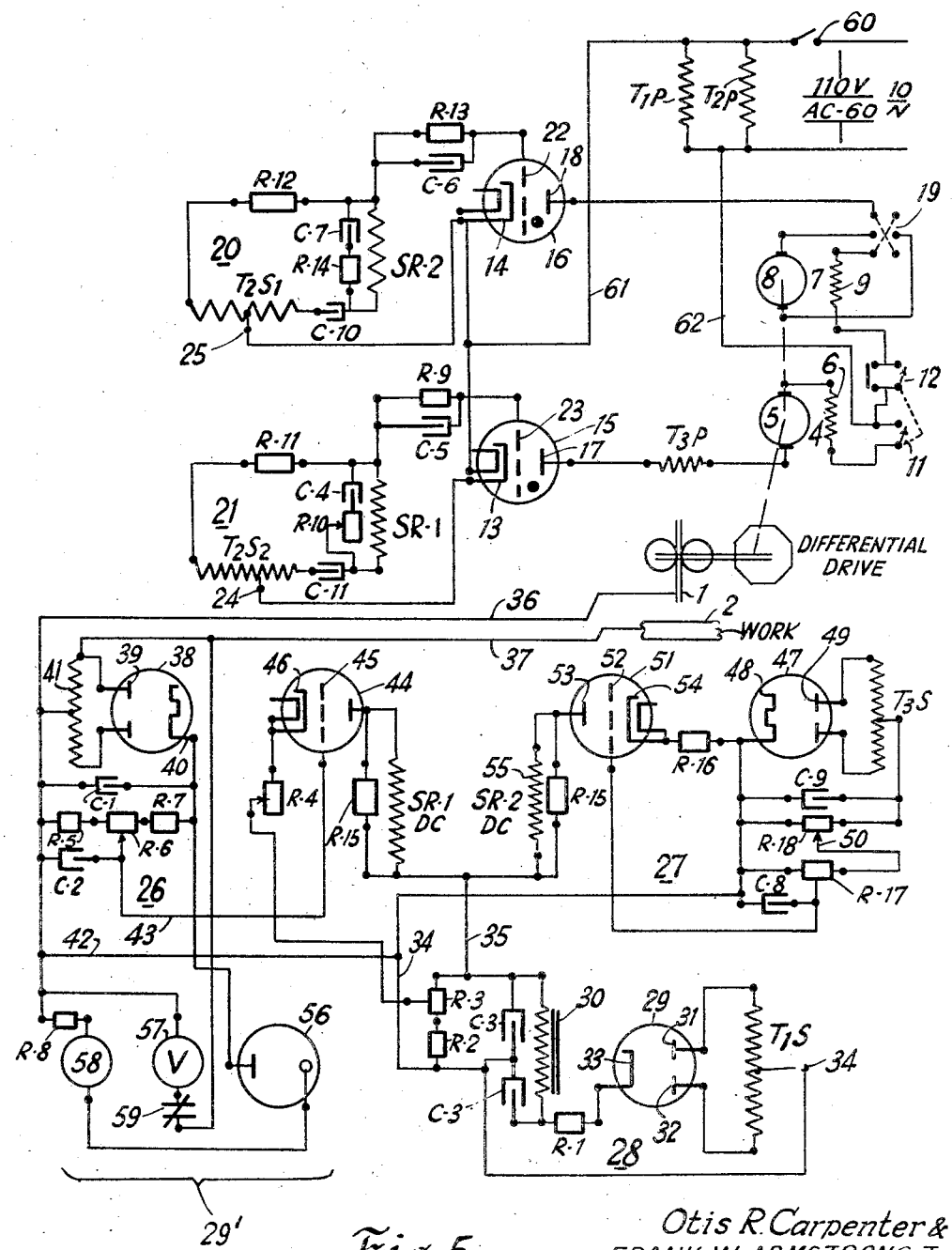
Fig. 5 is a wiring diagram showing the control circuits for the illustrative welding system.

With the above mechanism the rate of advance of the paired electrodes such as 1 and 1' is a direct function of the difference between the speeds of the motors 4 and 7 and with the motors operating in opposite directions, the rate of electrode advance is quickly and accurately controlled by effecting relatively small changes in their rates of operation. Thus, if the speed of the motor 7 is increased 10%, there is a double corrective effect upon the movement of the electrode if the speed of the motor 4 is simultaneously decreased 10%. Such changes in the motor speed are effected by the electronic control system indicated in Fig. 5. Here, the series wound driving motor 4 is shown as having an armature 5 with a field winding 6 and the similarly wound motor 7 is indicated as having the armature 8 and the field winding 9.

An alternating current source 10 is connected on the one side by lead 62 to the starting switches 11 and 12 and then to the respective motor fields 6 and 9. The other side of the alternating current source is connected by lead 61 to the cathodes 13 and 14 of the electronic waves 15 and 16. These are grid controlled rectifiers, such as thyratrons, the anode output of which is connected, in the case of tube 15, from anode 17 in series relation to the primary winding $T_3P$ of a voltage transformer $T_3$ to armature 5 and, in the case of tube 16, from anode 18 through reversing switch 19 to armature 8. In this manner, pulsating direct current, controlled by the grid actions of their respective thyratron tubes, is supplied to each of the drive motors 4 and 7. The motors rotate in opposite directions and hence, when operating through the differential gear drive 3, the speed and direction of feed of the electrode 1 is the resultant of the difference of speed of the two drive motors.

The thyratron tube output is controlled by a grid circuit 20 for the one motor and by the grid circuit 21 for the other motor. Each of these circuits includes a phase-shift bridge having, in the case of circuit 20, the grid biasing means provided by the resistance R—13 and the capacitor C—6 connected to the alternating current winding of a saturable reactor SR—2 having the shunt capacitor resistor circuit C—7 and R—14. One side of the above winding is connected in series relation with capacitor C—10 and the secondary winding $T_2S_1$ of transformer $T_2$. The opposite end of the alternating current winding of the saturable reactor SR—2 is connected in series relation with resistance R—12 and to the secondary winding $T_2S_1$. The center tap 25 of the transformer winding $T_2S_1$ is connected to the cathode 14 of thyratron tube 16 thus completing the grid control circuit means of valve 16.

In a similar manner, grid 23 of thyratron tube 15 is controlled by the grid circuit 21 having a grid biasing means consisting of resistance R—9 and capacitor C—5 and the phase-shift bridge circuit consisting of the alternating current winding of the saturable reactor SR—1 having the shunt capacitor-resistor circuit including capacitor C—4 and the variable resistance R—10. One end of the saturable reactor winding is connected in series relation with capacitor C—11 and to the secondary winding $T_2S_2$ of transformer $T_2$. The other end is connected in series relation with resistor R—11 and the secondary winding $T_2S_2$. The center tap 24 of transformer winding $T_2S_2$ is connected to the cathode 13 of thyratron tube 15 thus completing the means for providing grid control of valve tube 15.

The saturable reactors described above as elements of the grid control circuits provide the variable elements by means of which the grid potentials of thyratron tubes 15 and 16 may be controlled. Means for control of these variable elements are provided by the voltage sensitive circuits shown in the drawing by circuit 26 and circuit 27.

The direct current source for control of the variable elements SR—1DC and SR—2DC is provided for by the common biphase full wave rectifier circuit 28. This circuit consists of rectifier tube 29 having the cathode 33 and anodes 31 and 32 which are connected to the transformer secondary winding $T_1S$. The center tap of this winding is connected to provide the common output 34 for voltage sensitive circuits 26 and 27 on the one side and the other outlet of the rectifier circuit is connected through a filter system (consisting of choke coil 30, resistance R—1 and capacitors C—3) to lead 35 which is common to both of the voltage sensitive circuits 26 and 27.

The degree of control of each of the voltage sensitive circuits which is introduced by means of the saturable reactors into the control grid circuits of the thyratron tubes 15 and 16 is determined by the value of the arc voltage at the work. This voltage is introduced into the circuit by leads 36 and 37 to the transformer winding 41 through the fullwave rectifier tube 38 having a cathode 40 and anodes 39. The output of this tube having a filtering system (consisting of shunt capacitor C—1, series-shunt resistors R—5, R—6 and R—7 and capacitor C—2) is connected on the one side to grid 45 of triode 44 and on the other to common lead 42 of the direct current supply circuit 28. When the value of the arc voltage changes from its preset value (determined by variable resistance R—6) then the potential of grid 45 of triode 44 is changed in value and the direct current field of reactor winding SR—1DC varies accordingly.

The variation of the direct current field of SR—1DC alters the output of thyratron tube 15. In the anode circuit of this thyratron a primary winding $T_3P$ of a voltage transformer $T_3$ is connected in series relationship so that variations in the output of tube 15 causes a corresponding voltage variation to occur in the transformer secondary $T_3S$ in the voltage sensitive circuit 27 by virtue of the alternating current component of the pulsating direct current output of thyratron tube 15. This voltage is rectified by fullwave rectifier 47 having the cathode 48 and anodes 49. In shunt relationship with the output of tube 47 is capacitor C—9 and resistance R—18 which is provided with the variable tap 50 to which in series parallel relationship is connected R—17. The control member 52 of triode 51 is connected to the variable connection of R—17. By means of adjustment of the value of this resistance an adjustment of the voltage output may be made. Variations in the grid potential of control member 52 as affected by variations in the output of thyratron tube 15 cause a change in the direct current field of the direct current winding 55 of saturable reactor SR—2, having shunt resistor R—15. The change in the field of this member alters the output of thyratron tube 16 by means of a phase shift and consequently alters the speed of motor 7.

When high open circuit arc voltages as may be employed in atomic hydrogen welding are used, circuit 29' consisting of diode tube 56, relay 58 and contact 59, and resistor R—8 is used to prevent application of the open circuit voltage to meter 57 when the arc has not been established.

Variable resistance R—4 is connected in series relation with cathode 46 of triode 44 and the movable arm of resistance R—3 to adjust the fixed bias current of triode 45 thereby providing for adjustment of the variable element SR—1DC and in consequence providing a balancing system between the voltage sensitive circuits 26 and 27 to aid in the elimination of "pumping" of the electrode.

When the illustrated control system is made operative, power switch 60 is moved to the closed position energizing the transformer primaries $T_1P$ and $T_2P$ and providing for connection of one side of the supply by lead 61 to the cathodes of valve tubes 15 and 16 the outputs of which are connected to the armatures of series wound motors 4 and 7. Upon closing switches 11 and 12 the supply circuit to the motors is completed by means of lead 62 and pulsating direct current is supplied to each motor.

The control of the current to each of the motors is a function of the potential established on each of the control members 22 and 23 of the thyratron tubes 15 and 16. Each of the thyratron tubes is thus arranged in its own operative circuit and control of one motor is independent of the other except as provided for by the interlocking of the control circuit 27 into the output of thyratron tube 15 by the voltage transformer $T_3$.

When the motors are energized and the electrode 1 fed to work 2 and an arc established, the arc voltage is held at a value preset by the voltage divider system provided for by circuit 26 and specifically by the presetting of variable resistance R—6. As long as this preset arc voltage is maintained and the arc length held constant the output of the two voltage sensitive circuits 26 and 27 to the control members 45 and 52 of their respective triodes 44 and 51 remains at the preset value holding a constant direct current field on the variable elements SR—1DC and SR—2DC. This produces a constant speed in each of the drive motors.

When the arc voltage or arc length varies from a preset value as arranged by adjustment of resistance R—6 a corresponding change occurs in the direct current field of SR—1DC and results in a phase shift of the circuit 21, causing a phase shift of the grid voltage applied to control member 23 of thyratron tube 15. This alters the output from anode 17 resulting in a slowing or speeding up of the driver motor 4.

At the same time an output change of anode 17 of thyratron tube 15 changes the voltage across transformer T—3, the primary of which is in series relation with the output. The consequent change in the secondary $T_3S$ of this transformer changes the output of the sensitive circuit 27 and this in turn changes the current through the direct current winding of variable element SR—2 and consequently causes a phase shift in the control circuit 20 of thyratron tube 16. The output of this tube then alters the speed of the driver motor 7 so that there is obtained an interlocking relationship of the one driver to the other. Thus, if the variation in arc voltage is such as to require greater rod feed this interlocking system will result in the one driver 4 speeding up and the other driver 7 slowing down. If the arc welding current is suddenly increased from one low value to another high value there will result a momentary arc voltage increase which will speed-up driver 4 and slow up driver 7, the difference in speed of the two drivers determining the rate of rod feed. By this means the hand control of the rod feed common to most arc welding operations is made automatic for any arc voltage or current adjustment.

Résumé

The illustrative apparatus includes a plurality of welding heads each of which is separately driven by a twin motor assembly. The motors of each assembly are effective in regulating the advance of the electrode through a differential mechanism with a double worm and gear reduction interposed between each motor shaft and the differential. Each leg of this drive is connected through a set of bevel gears to a threaded drive rod. This screw drives a nut which is attached to the main collet assembly, this assembly holding the tungsten electrode and providing for feeding two inches of the tungsten into the arc. After that two inch length of the electrode is fed to the arc, the grip of the electrode holder upon the electrode must be released by releasing the collet moving the tungsten head or holding the tungsten while the nut at the head of the collet assembly is threaded back toward the upper part of its path of movement.

Of the two series wound motors for each welding head, one is operated in a direction so as to move the tungsten electrodes in an upward direction, and the other is operated so as to move the tungsten in a downward direction. Since these motors drive through a differential mechanism, the movement of the tungstens is in accordance with the resultant differential in speed of the two motors. Reversal of the direction of electrode movement does not require complete stopping and starting of a motor with the attendant overcoming of the inertia of the motor together with its driving mechanism, but simply requires the speeding up or the slowing down of one or both of the motors.

The motors may be of a type designed to run at a maximum speed of 10,000 R. P. M., and in the normal welding control operation of the motors, their speeds are varying between 1500 R. P. M. and 5,000 R. P. M.

The differential gear assembly and the bevel gear casing are all of ball bearing construction. The differential gear mechanism is arranged to run in oil, the oil element being indicated on the front of the casing.

Each of the main collet assemblies described above operates in a stainless steel water cooled nozzle guide. Each guide consists of an inner and outer tube with the coolant chamber therebetween baffled off to provide for water circulation to the electrode tip and back. Also provided is a small internal copper tube which introduces hydrogen at the inside, and results in an envelope of hydrogen around each electrode tip. Means are provided for hydrogen and water connections at the top of each water guide.

The tungsten electrodes are placed in their collets through the tips. Each tip is removable and replaceable so as to provide for different changes in collet sizes and provide for the cleaning of the tips. Collets are removed by unscrewing the brass nut at the top of the collet assembly, removing the tip, and removing the collet through the bottom opening.

The screw and nut drive provided for operating each tungsten collet assembly into the arc will run out approximately two inches of tungsten. When this amount of electrode has been burned it is necessary to manually release the collet and drive the head in an upward direction until the nut again is positioned at the top of the drive screw. The head is run in an upward direction by placing the "up-down" switch for that head in the "up" position, and pushing the button of the inch switch or by turning on the weld switch, with the main weld switch in the "off" position.

Screws are provided for positioning each welding head along the weld seam. These are so arranged that the heads may be brought together on 1½" centers or separated to any distances within a 14" separation of the side mounting plates. These adjustments are made by turning the screw threads located on the right side of the mounting plates. These adjustments are provided so that one or more of the heads may be adjusted to provide the correct degree of preheat for welding by the third head. It will, of course, be clear that these center distances between the arcs will not be changed, depending upon the welding speed, the amount of heat, the type of material welded, and the type of weld. It does, however, provide extreme flexibility of the adjustment of the heat input into the work.

Water distribution to the electrode collet guides is provided by means of a manifold baffle which acts as a heat shield deflecting the welding heat from the main part of each welding head or unit. The central part of the baffle makes up the outlet and is connected to one side of each collet guide. The inlet of each collet guide is connected to those connections at the outside rim of the baffle.

In addition to the water cooling system described above, an exhaust system is provided to remove hot air from the arcs and to prevent hydrogen accumulation. Preferably such an exhaust system is provided and attached under the manifold water baffle which provides the heat shield.

Each collet guide is supplied with a separate source of hydrogen. Hydrogen enters each head at the center behind the terminal board and a pressure of about five pounds (5 p. s. i.), is preferably utilized. In the operation of the described aparatus, it is advisable to have the air exhaust system in operation and to purge all lines before lighting the hydrogen. The hydrogen is supplied through a solenoid valve which opens when water flows in the head and through the water flow switch. This water flow switch and the valve are connected in series to assure the flow of water before the hydrogen can be turned on.

What is claimed is:

1. In an electric welding system including ar electrode movable relative to the work by the driven element of a differential gearing having its driving elements rotated in opposite directions by a pair of high speed electric motors each connected to one driving element, and a source of electric current for said motors, a control circuit comprising, in combinaton, a pair of electric valve means each controlling the flow of current from the source to one of the motors; control means for one of said valve means operative, responsive to variations in the welding voltage from a predetermined value, to condition its controlled valve means to vary the current flow to the associated motor; and control means for the other valve means operative, responsive to such variation in the current flow, to condition its controlled valve means to vary the current flow to the other motor; the motors normally operating the driving elements at substantially the same speed, when the welding voltage is at said predetermined value, to maintain such driven element stationary and the changes in relative motor speeds due to such variations in current flow effecting relatively inverse changes in the speds of the differential driving elements to effect movement of such driven element to move the electrode to restore the welding voltage to said predetermined value.

2. In an electric welding system including an electrode movable relative to the work by the driven element of a differential gearing having its driving elements rotated in opposite directions by a pair of high speed electric motors each connected to one driving element, and a source of electric current for said motors, a control circuit comprising, in combination, a pair of gird-controlled electric valves each controlling the flow of current from the source to one of the motors; means associated with the gird of one valve and operative, responsive to variations in the welding voltage relative to a predetermined value, to vary the phase relation of the gird and plate voltages to vary the current flow to the associated motor; and means associated with the grid of the other valve and operative, responsive to such variation in current flow, to vary the phase relation of the gird and plate voltages to vary the current flow to the other motor; the motors normally operating the driving elements at substantially the same speed, when the welding voltage is at said predetermined value, to maintain such driven element stationary, and the changes in relative motor speds due to such variations in current flow effecting relatively inverse changes in the speeds of the differential driving elements to effect movement of such driven element to move the electrode to restore the welding voltage to said predetermined value.

3. In an electric welding system including an electrode movable relative to the work by the driven element of a differential gearing having its driving elements rotated in opposite directions by a pair of high speed electric motors each connected to one driving element, and a source of electric current for said motors, a control circuit comprising, in combination, a pair of grid-controlled electric valves each controlling the flow of current from the source to one of the motors; means associated with the grid of one valve and operative, responsive to variations in the welding voltage relative to a predetermined value, to vary the phase of the grid voltage relative to that of the plate voltage to vary the current flow to the associated motor; and means associated with the grid of the other valve and operative, responsive to such variation in current flow, to vary the phase of the grid voltage relative to that of the plate voltage, to vary the current flow to the other motor; the motors normally operating the driving elements at substantially the same speed, when the welding voltage is at said predetermined value, to maintain such driven element stationary, and the changes in relative motor speeds due to such variations in current flow effecting relatively inverse changes in the speeds of the differential driving elements to effect movement of such driven element to move the electrode to restore the welding voltage to said predetermined value.

4. In an electric welding system including an electrode movable relative to the work by the driven element of a differential gearing having its driving elements rotated in opposite directions by a pair of high speed electric motors each connected to one driving element, and a source of electric current for said motors, a control circuit comprising, in combination, a pair of grid-controlled electric valves each controlling the flow of current from the source to one of the motors; phase shifting means associated with the grid of one valve and operative, responsive to variations in the welding voltage relative to a predetermined value, to vary the phase of the grid voltage relative to that of the plate voltage to vary the current flow to the associated motor; and phase shifting means associated with the grid of the other valve and operative, responsive to such variation in current flow, to vary the phase of the grid voltage relative to that of the plate voltage to vary the current flow to the other motor; the motors normally operating the driving elements at substantially the same speed, when the welding voltage is at said predetermined value, to maintain such driven element stationary, and the changes in relative motor speeds due to such variations in current flow effecting relatively inverse changes in the speeds of the differential driving elements to effect movement of such driven element to move the electrode to restore the welding voltage to said predetermined value.

5. In an electric welding system including an electrode movable relative to the work by the driven element of a differential gearing having its driving elements rotated in opposite directions by a pair of high speed electric motors each connected to one driving element, and a source of electric current for said motors, a control circuit comprising, in combination, a pair of grid-controlled electric valves each controlling the flow of current from the source to one of the motors; a pair of saturable reactors each having an alternating current winding in circuit connection with the grid of one of said valves; means operative, responsive to variations in the welding voltage relative to a predetermined value, to vary the current flow in the direct current winding of one of said reactors to vary the saturation of the reactor to vary the phase of the grid voltage relative to that of the plate voltage of its associated valve to vary the current flow to the associated motor; and means operative, responsive to such variations in the motor current flow, to vary the current flow in the direct current winding of the other reactor to vary the saturation of the reactor to vary the phase of the grid voltage relative to that of the plate voltage of the other valve to vary the current flow to the other motor; the motors normally operating the driving elements at substantially the same speed, when the welding voltage is at said predetermined value, to maintain such driven element stationary, and the changes in relative motor speeds due to such variations in current flow effecting relatively inverse changes in the speeds of the differential driving elements to effect movement of such driven element to move the electrode to restore the welding voltage to said predetermined value.

6. In an electric welding system including an electrode movable relative to the work by the driven element of a differential gearing having its driving elements rotated in opposite directions by a pair of high speed electric motors each connected to one driving element, and a source of electric current for said motors, a control circuit comprising, in combination, a pair of grid-controlled electric valves each controlling the flow of current from the source to one of the motors; a pair of saturable reactors each having an alternating current winding in circuit connection with the grid of one of said valves; means, including a rectifier, operative, responsive to variations in the welding voltage relative to a predetermined value, to vary the current flow in the direct current winding of one of said reactors to vary the saturation of the reactor to vary the phase of the grid voltage relative to that of the plate voltage of its associated valve to vary the current flow to the associated motor; and means, including a rectifier and a transformer having one winding in circuit relation with said rectifier and the other winding in circuit relation with said last mentioned motor, operative, responsive to such variations in the motor current flow, to vary the current flow in the direct current winding of the other reactor to vary the saturation of the reactor to vary the phase of the grid voltage relative to that of the plate voltage of the other valve to vary the current flow to the other motor; the motors normally operating the driving elements at substantially the same speed, when the welding voltage is at said predetermined value, to maintain such driven element stationary, and the changes in relative motor speeds due to such variations in current flow effecting relatively inverse changes in the speeds of the differential driving elements to effect movement of such driven element to move the electrode to restore the welding voltage to said predetermined value.

OTIS R. CARPENTER.
FRANK W. ARMSTRONG, JR.

REFERENCES CITED

The following references are of record in the file of this patent:

UNITED STATES PATENTS

| Number    | Name        | Date          |
|-----------|-------------|---------------|
| 1,374,404 | Soons et al.| Apr. 12, 1921 |
| 1,514,591 | Smyser      | Nov. 4, 1924  |
| 1,514,592 | Smyser      | Nov. 4, 1924  |